United States Patent [19]

Okazaki et al.

[11] Patent Number: 5,686,490
[45] Date of Patent: Nov. 11, 1997

[54] METHOD FOR BREEDING INFANT LIVESTOCK AND FEED COMPOSITION

[75] Inventors: Akio Okazaki; Ikuo Bethunou, both of Aichi; Naoki Tsuchida, Hokkaido; Masaharu Hayashi, Wakayama, all of Japan

[73] Assignee: Kao Corporation, Tokyo, Japan

[21] Appl. No.: 442,294

[22] Filed: May 16, 1995

Related U.S. Application Data

[63] Continuation of Ser. No. 159,314, Nov. 30, 1993, abandoned.

[30] Foreign Application Priority Data

Nov. 30, 1992 [JP] Japan ................................. 4-320284

[51] Int. Cl.$^6$ ........................... A61K 31/23; A61K 47/44
[52] U.S. Cl. ................. 514/558; 514/560; 514/784; 514/785; 514/786; 426/330.6; 426/601; 426/606; 426/607
[58] Field of Search ........................ 514/558, 560, 514/784–786; 426/330.6, 601, 606, 607

[56] References Cited

U.S. PATENT DOCUMENTS

| | | | |
|---|---|---|---|
| 4,216,236 | 8/1980 | Mueller et al. | 426/72 |
| 4,282,265 | 8/1981 | Theuer | 426/607 |
| 4,329,359 | 5/1982 | Stahly | 424/312 |
| 4,423,072 | 12/1983 | Stahly | 424/312 |
| 4,528,197 | 7/1985 | Blackburn | 514/552 |
| 4,652,454 | 3/1987 | Remesy et al. | 426/74 |
| 4,670,268 | 6/1987 | Mahmoud | 426/72 |
| 4,925,637 | 5/1990 | Julien et al. | |
| 4,961,934 | 10/1990 | Iwasaki et al. | |
| 5,000,975 | 3/1991 | Tomarelli | 426/602 |
| 5,186,963 | 2/1993 | Howman | 426/72 |
| 5,227,403 | 7/1993 | Seto et al. | 514/547 |
| 5,258,197 | 11/1993 | Wheeler et al. | 426/607 |

FOREIGN PATENT DOCUMENTS

| | | | |
|---|---|---|---|
| 1215247 | 8/1989 | Japan | A23K 1/18 |
| 2261350 | 10/1990 | Japan | A23K 1/18 |

OTHER PUBLICATIONS

Derwent Abstract of Babayan et al WO/PCT 85/03002 Jul. 18, 1985.
Derwent Abstract of Riken JP 04252145 Sep. 8, 1992.
Derwent Abstract of Chubu JP 1215247 Aug. 29, 1989.
Derwent Abstract of Kao JP 2261350 Oct. 24, 1990.
Chem. Abstr. of Azain C.A. 120 (5): 536012 (1993).
Chem. Abstr. of Odle et al C.A. 112(9): 75749r (1989).
Chem. Abstr. of Lima et al C.A. 109(25): 229346j (1988).
Chem. Abstr. of Levy et al C.A. 102(1): 3727c (1984).
Proceedings of the Georgia Nutrition Conference for the Feed Industry, Nov. 19–26, 1991 pp. 99–107 Azan et al pregnant sow.
Journal of Animal Science, vol. 67, 1989, pp. 3331–3339 Benevenga Neonatal Piglets Oral MCT Liquid.
British Journal of Nutrition, vol. 41, 1979, pp. 85–93 Newport et al MCT 2d. Old Coconut Oil Piglets System Oil.
(No Date) Masakura MCT Baby Animals.
Patent Abstracts of Japan, Abstract of JP5219895, Kao Corporation (Mar. 8, 1993).
Patent Abstracts of Japan, Abstract of JP2100635, Kao Corporation (Dec. 4, 1990).
Patent Abstracts of Japan, Abstract of JP2261349, Kao Corporation, (Oct. 24, 1990).
Patent Abstracts of Japan, Abstract of JP2261350, Kao Corporation, (Oct. 24, 1990).

*Primary Examiner*—Shep K. Rose
*Attorney, Agent, or Firm*—Sughrue, Mion, Zinn, Macpeak, and Seas.

[57] ABSTRACT

A method for breeding an infant livestock is disclosed, which comprises orally administering a liquid feed composition comprising, as the main component, fats and oils having a fatty acid composition comprising 10% by weight or more of a saturated fatty acid having 6 to 12 carbon atoms to a newborn livestock within 24 hours from its birth. According to the present invention, the survival rate of an infant livestock, in particular, newborn pigs weighing less than 1 kg at birth can be improved and the growth efficiency of newborn pigs till weaning can be elevated.

10 Claims, No Drawings

METHOD FOR BREEDING INFANT LIVESTOCK AND FEED COMPOSITION

This is a Continuation of Application Ser. No. 08/159,314 filed Nov. 30, 1993, now abandoned.

FIELD OF THE INVENTION

This invention relates to a method for breeding infant livestock. More particularly, it relates to a method for breeding infant livestock having an effect of improving nutritional conditions whereby the survival rate of newborn livestock, in particular, newborn pigs, those weighing less than 1 kg at birth, can be improved and the growth efficiency of the animals till weaning can be elevated.

BACKGROUND OF THE INVENTION

In the pig raising industry, the number of piglings per delivery has been remarkably increased owing to the recent improvements in breeding and propagation techniques. As a result, the number of the newborn pigs often exceeds the number of the nipples of their mother and the variation in size of newborn pigs is widened. Under these conditions, weak piglings failing to take the foremilk are frequently observed.

Although such weak piglings are born at a ratio of from 10 to 20% per delivery, it is difficult to appropriately feed them due to the recent tendency in the pig raising industry toward the enlargement of scale and reduction of labor or a lack of man power. Consequently, these weak piglings are frequently allowed to stand and die.

In general, a newborn pig weighing less than 1 kg at birth (hereinafter referred to as weak piglings) is poor in reserve energy sources, in particular, accumulated somatic fat. When these piglings go to the outside world or search for their mother's breasts, therefore, glycogen (i.e., the main reserve energy source) is quickly consumed up. Unless they take nutrients during this period, not only weak piglings but also those having heavier weight at birth would die within 2 or 3 days. Accordingly, it is essentially required for newborn pigs to take breast milk as quickly as possible. A pigling of heavy weight at birth can start action to take breast milk immediately after birth. However, weak piglings cannot start action to take breast milk due to the lack of accumulated energy or fail to appropriately control their body temperature, which causes a survival rate of 50% or below. As the body weight decreases, the survival ratio lowers and breeding becomes almost impossible.

Under these circumstances, attempts have been made to elevate the survival rate of weak piglings by breeding piglings with the breast foremilk per se or a similar liquid milk. More particularly, the following methods have been employed:

(1) putting a weak pigling by a man's hand to the breast of its mother;

(2) feeding a weak pigling with, for example, cow's milk contained in a nursing bottle;

(3) thawing swine or bovine foremilk, which has been stored in a frozen state, and feeding a weak pigling with it; and (4) feeding a weak pigling with a liquefied formula feed containing immunoglobulin.

Also, there has been employed another method wherein newborn pigs are divided into groups depending on body weight and those of heavier weight are separately fed so as to secure breast milk for weak ones.

However, these methods each requires much labor and a long time, which makes it unsuitable for a multiple breeding system. Further, the hard labor is not fully rewarded, since the survival rate is improved only slightly or insufficiently thereby. Therefore, it has been required to established a further improved method therefor.

U.S. Pat. No. 4,925,637 has disclosed a liquid additive for animal feeds which is prepared by dissolving perfumes in a fat-soluble fatty acid and homogeneously blending with fat. However, this feed additive essentially contains perfumes for improving preference and aims at improving workability and solving the problem of caloric saturation in relatively matured livestock. That is to say, no discussion is made therein relating to the improvement in the survival rate of weak piglings as described above. There is a fear that weak piglings would not willingly take a feed containing such an additive, since it is excessively stimulative to them. Thus, the effect of improving the nutritional conditions cannot be always achieved thereby.

SUMMARY OF THE INVENTION

In order to improve the survival rate of newborn livestock, in particular, weak piglings, and to elevate the body weight of weak piglings at weaning, the present inventors have conducted extensive studies on energy sources capable of directly improving the body powers of piglings. As a result, they have successfully found that the survival rate of weak piglings can be remarkably improved by the administration (preferably oral administration) of fats and oils having a fatty acid composition comprising a saturated fatty acid having from 6 to 12 carbon atoms to newborn livestock, in particular, weak piglings and that an effect of improving the nutritional conditions and thus increasing the body weight at weaning is achieved thereby. The present invention has been completed based on these findings.

Accordingly, the present invention relates to a method for breeding infant livestock which comprises orally administering a liquid feed composition comprising fats and oils having a fatty acid composition comprising 10% by weight or more of a saturated fatty acid having 6 to 12 carbon atoms to a newborn livestock within 24 hours from its birth.

DETAILED DESCRIPTION OF THE INVENTION

The composition to be used in the method of the present invention is a liquid which is fluid at room temperature and contains, as the main component, fats and oils having a specific fatty acid composition. Regarding the fatty acid composition, the fats and oils to be used in the present invention comprise 10% by weight or more, preferably 25% by weight or more, more preferably from 25 to 60% by weight, and still more preferably from 25 to 50% by weight, based on the weight of the whole fatty acid composition, of a saturated fatty acid having from 6 to 12 carbon atoms, preferably from 6 to 10 carbon atoms (the weight of the fatty acid and the fatty acid composition are in terms of fatty acid(s)). Although two or more kinds of such fats and oils may be used in combination, the fatty acid composition of the whole fats and oils mixture should fall within the range as specified above in this case. When the content of the saturated fatty acid having 6 to 12 carbon atoms in the fatty acid composition is less than 10% by weight, the effect as an energy source for piglings may not be fully achieved.

The fats and oils to be used in the present invention may be obtained by blending natural fats and oils. However, it is preferable from the viewpoint of adjusting the fatty acid composition to use a mixture of triglycerides of saturated fatty acids having 6 to 12 carbon atoms with glyceride (middle chain fatty acid triglyceride, hereinafter referred to simply as MCT) and long chain fatty acid (having 16 to 18 carbon atoms) triglycerides (hereinafter referred to simply as LCT) therefor. Examples of commercially available MCT include Healthip® FO, Coconad® MT, Coconad® RK and Coconad® MT-N (each a product of Kao Corporation). In the fatty acid composition of the fats and oils according to the present invention, it is preferable that the content of an unsaturated fatty acid having 16 or more carbon atoms amounts to from 20 to 70% by weight as components other than the saturated fatty acids having 6 to 12 carbon atoms. By taking preparation and effects into consideration, it is particularly preferable to use fats and oils comprising a middle chain fatty acid triglyceride and a long chain fatty acid triglyceride at a weight ratio of from 60/40 to 25/75. The presence of the unsaturated fatty acids having 16 or more carbon atoms imparts an appropriate fluidity to the composition and exerts an effect of relieving stimulation in a case where MCT alone is excessively stimulative to infant livestock. These unsaturated fatty acids having at least 16 carbon atoms are preferably those originating in natural fats and oils, more preferably vegetable oils such as soybean oil and corn oil.

The composition to be used in the method of the present invention contains the above-mentioned fat as the main component. In addition thereto, it may further contain fat-soluble substances capable of being blended with a feed for infant livestock, for example, fat-soluble vitamins such as vitamin A, vitamin D and vitamin E, precursors thereof such as β-carotene and derivatives thereof either singly or combinedly.

The liquid feed composition according to the present invention can be orally administered to infant livestock as such, without blending with other feeds or breast milk, to thereby effectively supply an energy source. Although examples of the infant livestock to be fed therewith include calves, foals and piglings, the present invention is not restricted thereto but applicable to newborn pet animals such as cats and dogs and others. In particular, the liquid feed composition according to the present invention exerts an excellent effect on weak piglings which weigh less than 1 kg at birth and cannot suck milk or move by themselves. The term "newborn" as used herein means a period ranging from birth to suckling. In general, 0.5 to 10 g of the composition is orally administered to such weak piglings within 24 hours from its birth. When the administration of the feed composition is excessively stimulative to the piglings, a reduced dose may be employed. Although the feed composition may be administered to other infant livestock almost at the same level, the dose may be optionally adjusted since the effect as an energy source somewhat varies from individual to individual.

When given to weak piglings which cannot walk and suck milk by themselves, the liquid feed composition according to the present invention can supply the animals energy sufficient for moving by themselves. In addition, it can supply them body powers capable of coping with changes in bodily temperature following birth.

As a result, the survival rate of weak piglings, which has been maintained at an extremely high level, can be significantly improved, thus elevating the productivity.

To further illustrate the present invention in greater detail, the following Examples will be given. However it is to be understood that the present invention is not restricted thereto.

EXAMPLE 1

By using commercially available $C_8$–$C_{10}$ MCT (Coconad MT, a product of Kao Corporation) and soybean oil as an LCT source, liquid feed compositions for infant livestock as specified in Table 1 were prepared.

The fatty acid compositions of Coconad MT and Soybean oil are shown below.

| Coconad MT | |
| --- | --- |
| $C_8$–$C_{10}$ saturated fatty acids: ($C_8$: 80% by weight; $C_{10}$: 20% by weight) | 100% by weight |
| Soybean oil | |
| Unsaturated fatty acids of $C_{16}$ or above: | 15% by weight |
| Saturated fatty acids of $C_{16}$ or more: | 85% by weight |

Each feed composition for infant livestock was orally administered to weak piglings (5 animals for each sample) within 12 hours from its birth in a dose of 4 g/animal and the conditions of the piglings were observed. Table 1 summarizes the results, wherein each MCT:LCT ratio is by weight.

TABLE 1

| | The Present Invention | | | | Comparison | |
| --- | --- | --- | --- | --- | --- | --- |
| Ratio of MCT:LCT | 60:40 | 50:50 | 30:70 | 15:85 | 5:95 | 0:100 |
| At Breeding | — | — | — | — | — | — |
| After 20 min | squeak | stand | stand | — | — | — |
| After 30 min | squeak | suck | suck | — | — | — |
| After 60 min | stand | suck | suck | stand | — | — |

In the above table, "–" means that the piglings showed no noticeable change and could not move by themselves; "squeak" means that the weak piglings, which had not been capable of moving by themselves before the administration, squeaked as they lay, without taking any action to suck; and "stand" means that the piglings stood up by themselves around 20 minutes after the administration and walked by themselves to the breast of the mother, namely, becoming vigorous.

About 20 minutes after the administration of a feed composition of a high MCT content, the piglings abnormally squeaked for a while. After calming down, they began to suck. In each of the test lots fed with the feed of the present invention, about 85% of the piglings stood up by themselves and began to suck about 20 minutes after the administration.

EXAMPLE 2

Effects of the liquid feed composition for infant livestock of the present invention on weak piglings were examined.

Namely, newborn pigs weighing less than 1 kg at birth were used and 4 to 5 g of a liquid feed composition comprising a fat mixture having the fatty acid composition as specified below was orally administered to the animals within 6 hours from its birth. Then the growth rate and average body weight on age of 21 days of the test lot were compared with those of the control (non-administered) lot. Table 2 summarizes the results.

(Fatty acid composition of liquid feed composition)

| | |
|---|---|
| (1) $C_8$–$C_{10}$ saturated fatty acids: | 40% by weight |
| (2) Unsaturated fatty acids of $C_{16}$ or above: | 52% by weight |
| (3) Saturated fatty acids of $C_{12}$ or above: | 8% by weight |

The $C_8$–$C_{10}$ fatty acids (1) as given above were prepared by using commercially available MCT (Coconad MT; a triglyceride mixture manufactured by Kao Corporation), while the unsaturated fatty acids of $C_{16}$ or above were prepared by using soybean oil.

TABLE 2

| | Control lot | Test lot |
|---|---|---|
| Number of tested piglings | 65 | 32 |
| Number of weaning piglings | 37 | 27 |
| Growth ratio (%) | 56.9 | 84.4 |
| Average body weight at birth (kg) | 0.80 | 0.79 |
| Average body weight on 21st day (kg) | 4.24 | 5.16 |

The following Table 3 shows the survival rate depending on body weight at birth observed in the above test.

TABLE 3

| Body weight at birth (kg) | Control lot (%) | Test lot (%) |
|---|---|---|
| 0.9 or more - less than 1.0 | 80.9 | 100.0 |
| 0.8 or more - less than 0.9 | 64.7 | 85.7 |
| 0.7 or more - less than 0.8 | 38.5 | 78.5 |
| 0.6 or more - less than 0.7 | 36.4 | 70.0 |

EXAMPLE 3

By using the liquid feed composition for infant livestock prepared in the above Example 2, the evaluation of Example 2 was repeated except that the composition was orally administered to newborn pigs within 12 hours from its birth. Table 4 summarizes the results.

TABLE 4

| | Control lot | Test lot |
|---|---|---|
| Number of tested piglings | 93 | 61 |
| Number of weaning piglings | 51 | 47 |
| Growth ratio (%) | 54.8 | 86.5 |

TABLE 4-continued

| | Control lot | Test lot |
|---|---|---|
| Average body weight at birth (kg) | 0.81 | 0.82 |
| Average body weight on 21st day (kg) | 4.37 | 4.98 |

While the invention has been described in detail and with reference to specific embodiments thereof, it will be apparent to one skilled in the art that various changes and modifications can be made therein without departing from the spirit and scope thereof.

What is claimed is:

1. In a method for breeding an infant animal which comprises orally administering a liquid feed composition comprises fats and oils having a fatty acid composition comprising 10% by weight or more of a saturated fatty acid having 6 to 12 carbon atoms to a newborn animal within 24 hours from its birth, the improvement which comprises said fats and oils comprising a triglyceride of a middle chain fatty acid having 6 to 12 carbon atoms and a triglyceride of a long chain fatty acid having 16 or more carbon atoms in a weight ratio of said triglyceride of said middle chain fatty acid to said triglyceride of said long chain fatty acid of from 60/40 to 25/75, whereby due to the oral administering of said liquid feed the survival rate of said infant animal is improved.

2. The method of claim 1, wherein said fats and oils have a fatty acid composition comprising 25% by weight or more of a saturated fatty acid having 6 to 10 carbon atoms.

3. The method of claim 2, wherein said saturated fatty acid amounts from 25 to 60% by weight in the fatty acid composition of said fats and oils.

4. The method of claim 3, wherein said fatty acid composition further comprises from 20 to 70% by weight of an unsaturated fatty acids having 16 or more carbon atoms.

5. The method of claim 1, wherein said triglyceride of a long chain fatty acid is a vegetable oil.

6. The method of claim 1, wherein said infant animal is a weak pigling.

7. The method claim 1, wherein said liquid feed composition is administrated in an amount of from 0.5 to 10 g.

8. The method of claim 1, wherein said infant animal is a calf, foal or piglet.

9. The method of claim 1, wherein said infant animal is a puppy or kitten.

10. The method of claim 1 wherein said infant animal is a newborn pig weighing less than 1 kg at birth.

* * * * *